United States Patent [19]

Washeleski et al.

[11] Patent Number: 5,334,876
[45] Date of Patent: Aug. 2, 1994

[54] POWER WINDOW OR PANEL CONTROLLER

[75] Inventors: John Washeleski, Reed City; Mark R. Wheeler, Cadillac; Mario Boisvert, Reed City, all of Mich.

[73] Assignee: Nartron Corporation, Reed City, Mich.

[21] Appl. No.: 872,190

[22] Filed: Apr. 22, 1992

[51] Int. Cl.⁵ .................... G05D 3/20; H02H 7/085
[52] U.S. Cl. .................... 307/10.1; 318/469; 49/26
[58] Field of Search .................... 318/280–286, 318/456, 458, 453; 49/26, 138; 307/9.1, 10.1; 296/216, 223

[56] References Cited

U.S. PATENT DOCUMENTS

| 4,686,598 | 8/1987 | Herr | 318/286 |
|---|---|---|---|
| 4,823,059 | 4/1989 | Compeau et al. | 318/454 |
| 4,980,618 | 12/1990 | Milnes et al. | 318/286 |
| 5,204,592 | 4/1993 | Huger | 318/286 |

OTHER PUBLICATIONS

NHTSA Notice, Federal Motor Vehicle Safety Standards, Federal Register, Apr. 16, 1991.

*Primary Examiner*—A. D. Pellinen
*Assistant Examiner*—Peter Ganjoo
*Attorney, Agent, or Firm*—Watts, Hoffmann, Fisher & Heinke

[57] ABSTRACT

A controller for energizing a power window or panel such as a power sunroof. The disclosed controller senses both hard and soft obstructions and deactivates a motor that moves the sunroof when an obstruction is detected. The controller also senses obstructions during start-up of the motor and regulates the speed of the window or panel by pulse width modulating motor energization signals.

12 Claims, 5 Drawing Sheets

POWER WINDOW OR PANEL CONTROLLER

FIELD OF THE INVENTION

The present invention concerns a control system for use in activating a motor driven window or panel. One example of such a window or panel is a motor vehicle sunroof.

BACKGROUND ART

National Highway Traffic Safety Administration Standard 118 contains regulations to assure safe operation of power operated windows. Standard 118 has been amended to apply to power operated roof panels. It establishes requirements for power window control systems located on the vehicle exterior and for remote control devices. The purpose of the standard is to minimize the risk of personal injury that could result if a limb is caught between a closing power operated window and the window frame. The changes to Standard 118 become effective Sep. 1, 1992. Amended Standard 118 states that the maximum force allowable during an auto closure is to be less than 22 pounds onto a solid cylinder having a diameter of between 4 and 200 millimeters.

Certain problems have been identified with operation of existing power window controls. One problem is an undesirable shutdown of the power window control. It is also desirable to detect a soft obstruction in the window travel path as well as a hard obstruction. The gasket area of the window which avoids water seepage into the vehicle can present a problem to the design of a power window control, since the window or panel encounters different resistance to movement in the gasket region. An additional problem is detection of an obstruction when the motor is first activated.

DISCLOSURE OF THE INVENTION

The present invention provides method and apparatus for controlling operation of motor vehicle power window systems as well as power roof panels. The control system of the invention includes a sensor, which provides absolute position, speed and direction of movement, and a control circuit for controllably activating a motor to move a window or panel.

In accordance with one embodiment of the invention, the control circuit activates the motor to move a window or panel along a travel path and deactivates the motor if an obstacle is encountered by the window or panel. Striking an obstruction causes the motor current to rise since the energy supplied by the battery is no longer dissipated in rotating the motor shaft. A motor sense circuit coupled to the control circuit senses the motor current as the motor moves the window or panel along its travel path.

In accordance with one aspect of the invention, the control circuit monitors motor current from the motor sense circuit and times a start-up interval each time the motor is energized. The control circuit compares sensed motor current after the start-up interval with a predetermined motor current and stops the motor if the sensed motor current exceeds the predetermined motor current. This will detect an attempt to start movement with an obstruction next to the window or panel.

In accordance with an additional aspect of the invention, the control circuit monitors and saves an indication of motor current vs. position during a calibration sequence. As the motor moves the window or panel subsequent to the calibration sequence, the control circuit compares sensed motor current with motor currents sensed during the calibration sequence. If too large a deviation in motor current is sensed, the control circuit stops the motor.

The control circuit updates the profile of current vs. position as the window or panel is opened and closed. This updating assures that as the window or panel drive mechanism changes with use, the control circuit maintains an up-to-date profile for detecting obstructions.

These and other features of the invention are described below in the best mode for practicing the invention, which is described in conjunction with the accompanying drawings.

BEST MODE FOR PRACTICING THE INVENTION

Figure 1A:
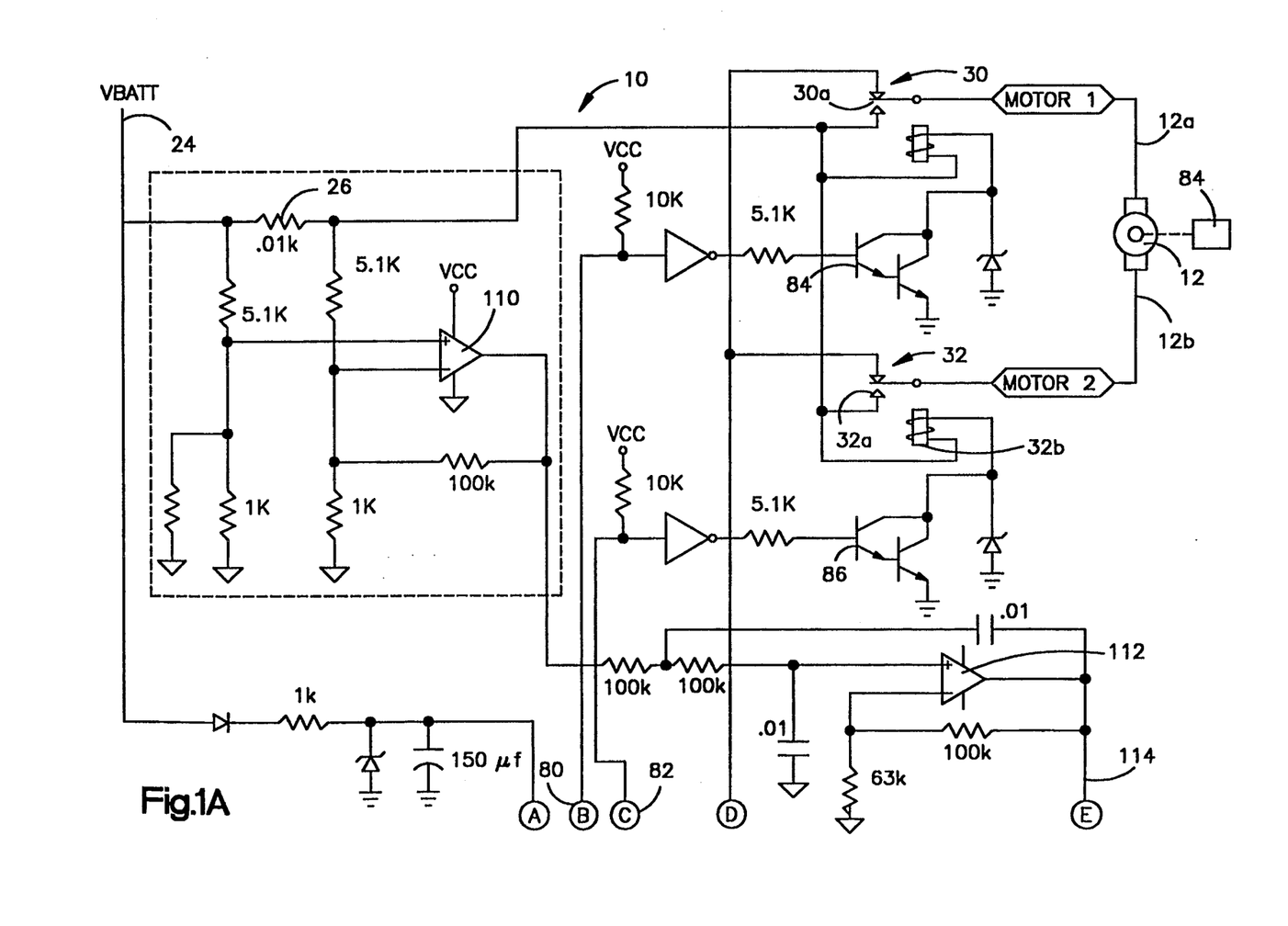
FIGS. 1A and 1B are schematics of a power window or panel control circuit constructed in accordance with the present invention.
Figure 1B:
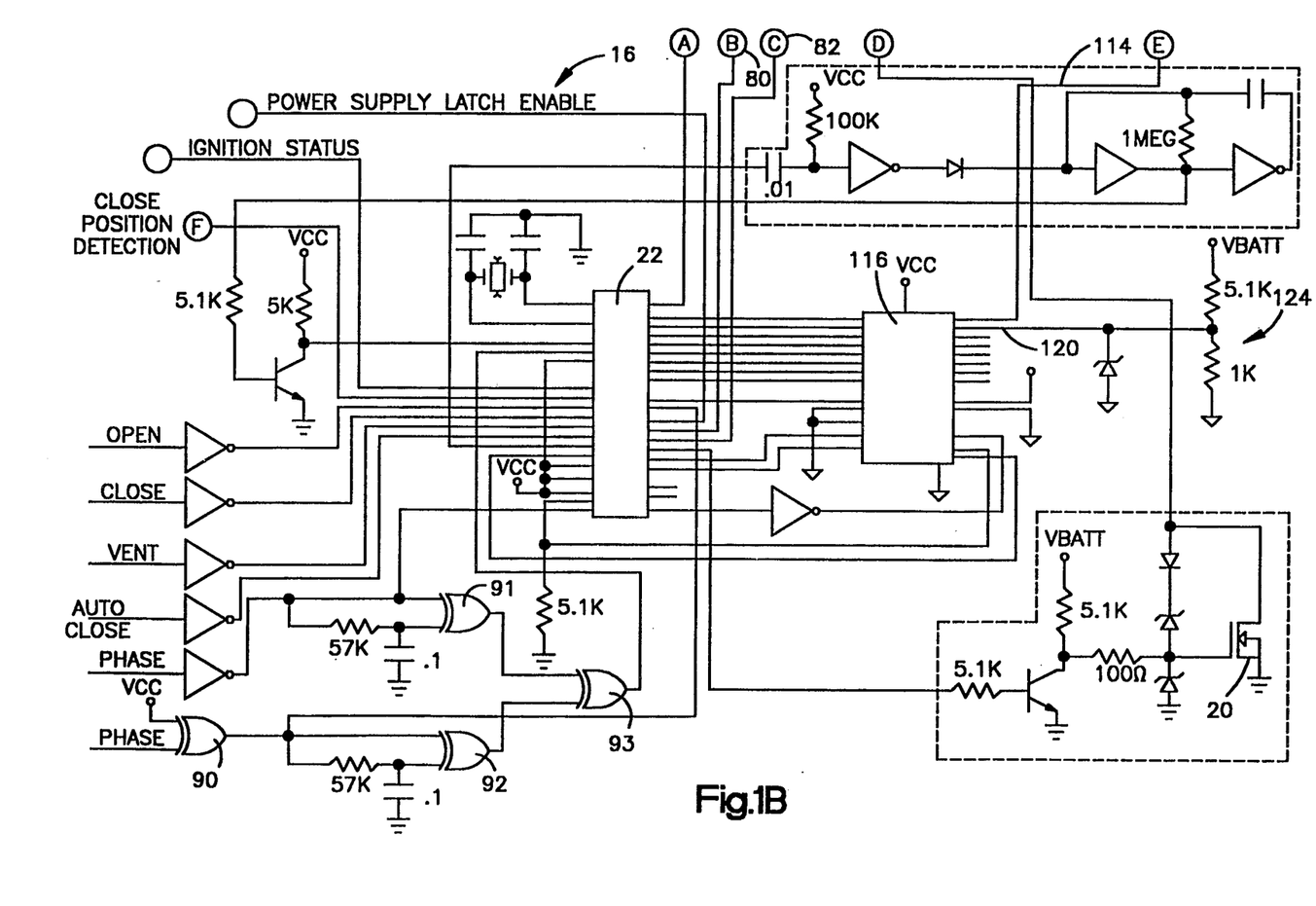
Figure 1C:
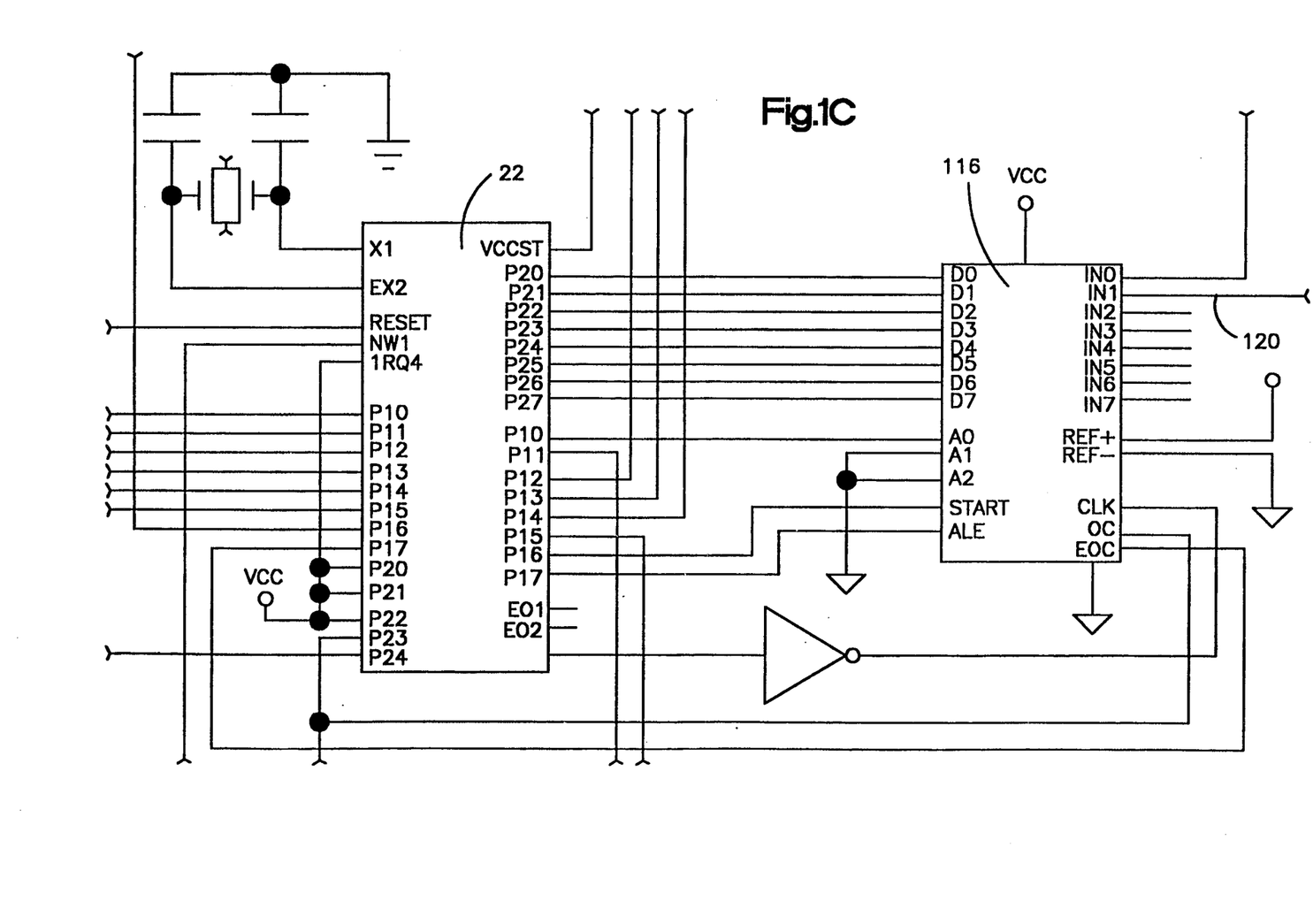
FIG. 1C is an enlarged schematic depiction of a portion of the FIG. 1B schematic.

Turning now to the drawings, FIGS. 1A and 1B depict a circuit 10 for activating a d.c. motor 12 having an output shaft coupled to a transmission that moves a window or panel in a motor vehicle. A pulse width modulation activation of the motor windings controls the speed of motor output shaft rotation as the motor opens or closes the window or panel. When used to operate a power sunroof the control circuit 10 can open the sunroof, close the sunroof, and also tilt open the sunroof to a vent position. The preferred embodiment of the invention concerns a power operated sunroof but other panels or windows could be actuated using the disclosed control circuit 10.

Motor energization is accomplished by controlled actuation of a solid state device (semiconductor) Field Effect Transistor (FET) 20 (FIG. 1B) which could also be a transistor, triac, or SCR whose conductive state is controlled by a microprocessor controller 22. Although a microprocessor controller 22 is used in the preferred embodiment of the invention, hard-wired circuitry could be used to implement the disclosed controlled motor energization.

Power is applied to the motor 12 from the motor vehicle battery. As seen in FIG. 1A a battery input 24 is coupled through a resistor 26 to one of two single pole double throw relays 30,32. When one or the other of the contacts 30a,32a of the relays 30, 32 are closed, a current path from the battery input 24 through the motor windings to ground is controlled by the conductive state of the FET 20.

Power Supply

Figure 3:
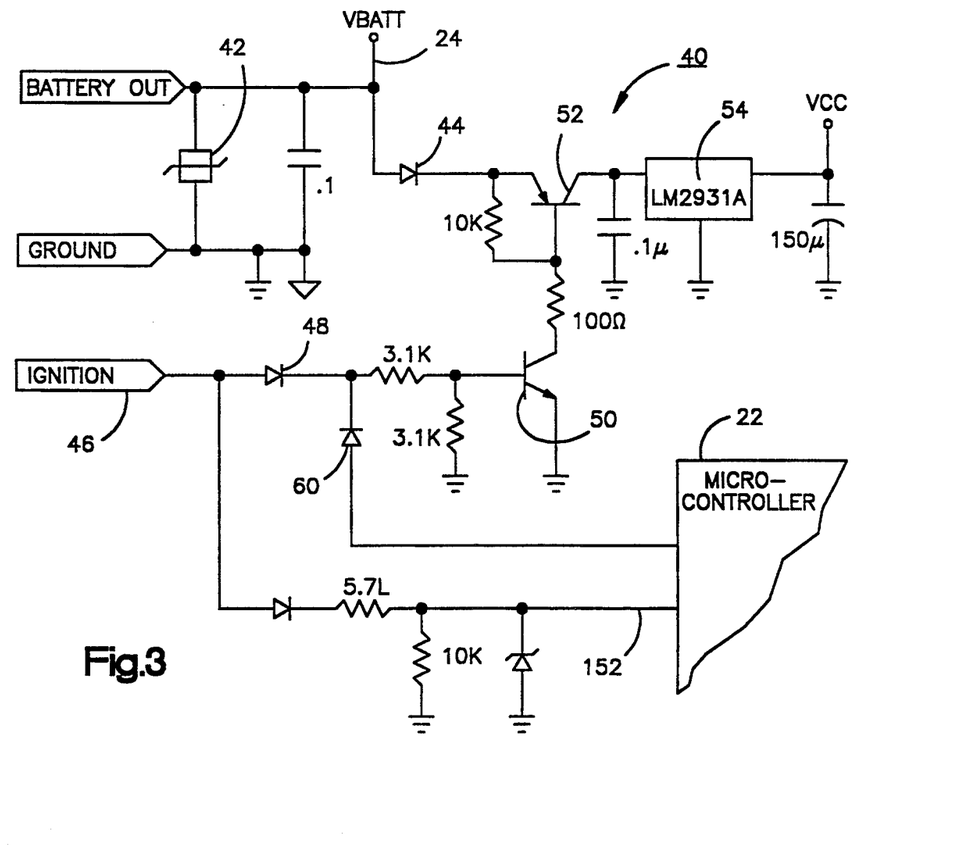
FIG. 3 is a power supply for providing regulated power to the FIGS. 1A and 1B circuit.

A power supply 40 depicted in FIG. 3 supplies a regulated voltage for powering the circuit 10. The power supply also protects the circuit 10 from external transients which could cause failure of the circuit 10. A metal oxide varistor 42 is used as a transient suppressor and a diode 44 protects the control circuit 10 from inadvertent reverse battery connection.

An ignition input 46 is used to control the condition of the power supply 40. When the ignition input goes high in response to the motorist actuation of the ignition key to either run, start, or accessory position, the high signal is transmitted through a diode 48 to a gate input of a transistor 50. This causes a second transistor 52 to conduct which applies the battery voltage to a voltage regulator 54. An output from the regulator 54 is a regulated voltage VCC for powering the circuit 10.

The power supply 40 is temporarily latched into operation for a time after the ignition signal has been removed when the user switches the ignition off. A diode 60 is connected to an output from the controller and latches the power supply 40 in the on condition. Latching of the power supply allows the circuit 10 to automatically close the power sunroof after the ignition key is turned to an off position. An advantageous feature of activating the power supply 40 and hence the circuit 10 only when the ignition is switched on is to reduce quiescent current.

External Interface

Figure 4:
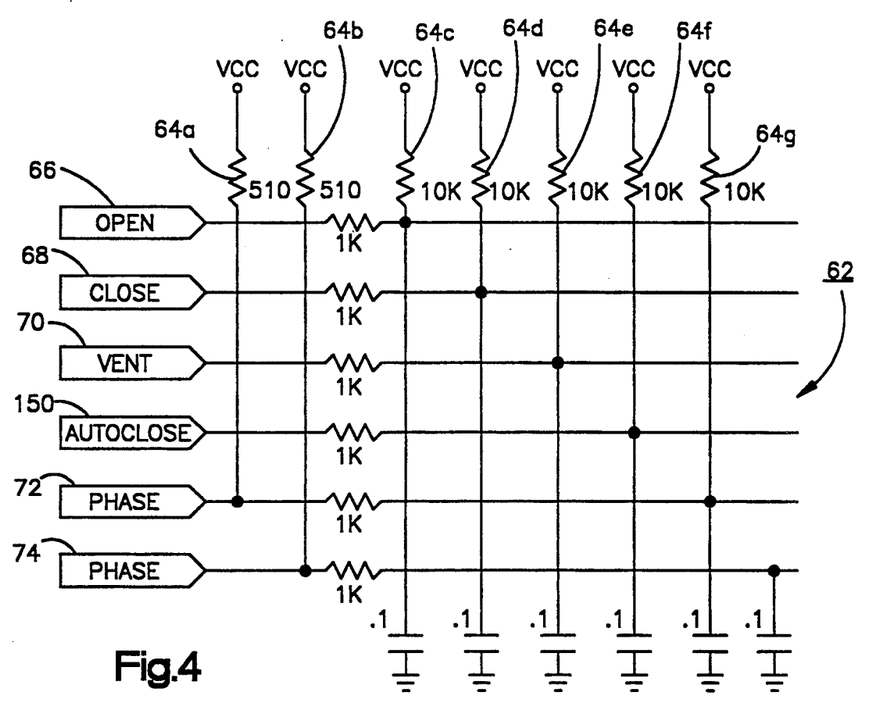
FIG. 4 is an interface for coupling inputs to a microprocessor depicted in FIG. 1B.

FIG. 4 depicts an interface 62 that couples additional signals to the circuit 10 by means of a series of pull-up resistors 64a–64g. The input designations on the left of FIG. 4 are active when they are pulled low. Corresponding labels are seen at the left of FIG. 1B. The inputs are summarized here and referred to below in describing detailed operation of the circuit 10.

An open input 66 is a momentary type input activated by the motorist and is used to open the sunroof. A close input 68 is also a momentary type input and is used to close the sunroof. A vent input 70 is a momentary type input and is used to move the sunroof to a vent position. Two phase inputs 72,74 are inputs that are connected to a position encoder. The phase inputs are toggled in a quadrature fashion and are used to provide sunroof panel speed, direction, and position feedback to the microprocessor 22.

Figure 5:
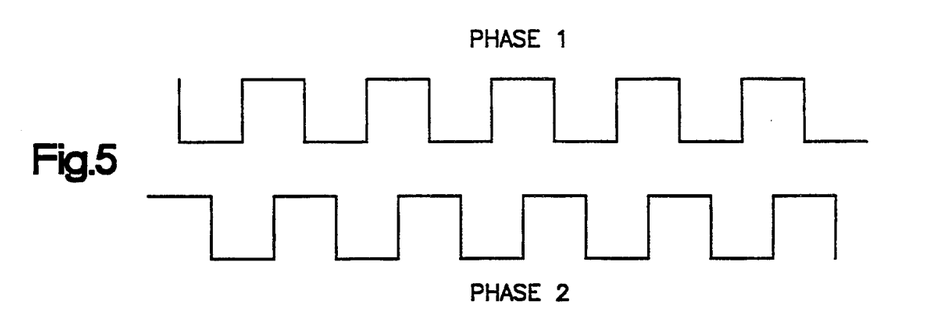
FIG. 5 is a schematic showing pulses produced by a motor shaft encoder that monitors position, speed, and direction of travel of said window or panel.

FIG. 5 depicts representative phase 1 and phase 2 signals from a motor shaft encoder, however, other position sensors such as a potentiometer or linear encoder can be used. At a given sampling time, the status of the two phase inputs is either 00, 01, 10 or 11. The transition states of these inputs allow the controller 22 to determine motor rotation direction. If the phase signals change, for example, from a 00 state to a 10 state, the motor is rotating in one sense. If the transition is from a 00 state to a 01 state, rotation is in an opposite sense. By monitoring the rate of change of the pulses, the controller 22 also determines motor speed. Finally, by counting pulses received as the sunroof moves from a park or closed position, the controller 22 can determine the position of the sunroof.

Motor Direction

In addition to controlling the pulse width modulation of the motor 12 the microprocessor controls the direction of motor actuation. Two microprocessor outputs 80,82 are used to activate Darlington switching transistors 84,86. When one transistor 84 is active an associated relay coil 30b is energized and the battery input 24 is coupled through the contact 30a to a motor terminal 12a. When the transistor 84 is not conducting, the coil 30b is not energized and the contact 30a couples the motor terminal 12a to the FET 20.

The Darling transistor 86, coil 32b and contact 32a are similarly configured to selectively connect the battery and FET connections to the motor terminal 12b. The outputs 80,82 from the microprocessor 22 can also be pulse width modulated to decrease motor drive torque as well as regulate the motor speed. When both coils 30b,32b are energized the motor windings are shorted to produce a braking effect.

A position encoder 83 produces the phase 1 and phase 2 signals for monitoring the speed, direction of movement and position of the sunroof. As seen in FIG. 1B the two phase inputs are coupled to four exclusive OR gates 90–93. These gates provide an interrupt signal to the controller 22 during a change of status of either of the two input phases 72,74. Two gates 91,92 are configured as one-shots which provide a pulse on both the leading and falling edges of their respective inputs. The output from these two one-shots are "ORED" together by the gate 93 and coupled to a non-maskable interrupt of the microprocessor.

Control Operation

The following summarizes the different functions the controller provides in actuating the motor 12. So called manual mode is achieved by the motorist actuating either an open, close, or vent key (not shown) for at least a predetermined interval to pull one of the three inputs 66,68,70 low (FIG. 4). When in manual mode the microprocessor 22 provides 100% power to the motor 12 to move the sunroof in a direction that is requested, unless the sunroof is found to already be in the selected position. The controller 22 removes power to the motor 12 to prevent damage once the sunroof has reached its requested destination.

In a so-called express mode of operation, the motorist may depress any one of the open, close, or vent keys for less than a preset time period. This causes the sunroof to begin moving until either the roof has reached its destination, an obstruction is encountered, or the user presses another key to interrupt the express mode selection. If the motorist chooses to stop the movement during the express mode, he or she presses any one of the open, close, or vent keys.

As battery voltage increases, the amount of power provided to the drive motor 12 also increases. If 100% power is applied to the motor, the motor speed will also increase, causing the window or panel to move at a faster rate. As the speed of the window or panel increases, the obstruction detection algorithm (discussed below) of the controller 22 has less time to detect an obstruction and to stop the motor.

To maintain a motor speed which is slow enough to allow the controller to detect and respond to an obstruction, battery voltage is monitored by the controller 22. The controller responds to changes in battery voltage and adjusts the amount of power applied to the motor 12. This is accomplished by varying the pulse width or duty cycle of motor energization via the FET 20 activation signal.

In the vent position the controller 22 can be activated to "nudge" the sunroof into a series of stepped positions which provides more precise roof positioning. When in the manual mode this nudging feature is active once the roof has reached the vent area. The vent will open to a first nudge position and stop. If the vent key is held longer than a timeout period the roof will nudge to the next level. This continues until the vent cycle is stopped manually by the user or a full vent position is reached. The nudge feature is only enabled while the roof is traveling toward the vent position. When moving the roof toward a park position, the manual mode functions normally.

Current Sense

As the motor 12 is activated by switching on and off the field effect transistor 20, current through the motor winding is sensed. A resistor 26 develops a voltage drop due to the current passing through the motor windings and this voltage is coupled to an operational amplifier 110 having an output which amplifies the voltage drop across the resistor 26. The operational amplifier 110 is configured as a differential amplifier.

The motor current signal output from the amplifier 110 contains undesired armature noise which is filtered from the output. This filtering is accomplished by an amplifier 112 which is configured as a second order low-pass filter. An output 114 from the filter amplifier 112 is coupled to an analog to digital convertor 116. The signal at the output 114 is converted to an 8-bit digital signal and coupled to the controller 22.

The pulse width modulation applied to the FET 20 is at a frequency of greater than one kilohertz. This is greater than the armature current noise and allows the motor current signal to be transmitted through the low-pass filter.

In addition to monitoring motor current, the controller 22 monitors battery voltage. An input 120 to the analog to digital convertor 116 is converted to an 8-bit signal and transmitted to the controller. The signal at the input 120 is derived from a voltage divider 124 coupled to the battery voltage VBATT and is used in determining pulse width modulation activation for the FET 20 as a function of battery voltage.

Calibration

To allow the controller 22 to perform the above functions it must first be calibrated. The calibration step need only be performed the first time power is applied to the circuit 10, subsequent to a power failure, or if the physical characteristics of the sunroof change. If calibration has not been performed an auto closure and express features are inhibited.

The motorist initiates a calibration sequence by pressing both the open and close keys simultaneously before actuating the ignition. The user must keep both keys depressed through the entire calibration process. When in the calibration mode the controller will learn all information it needs for a particular sunroof to which it is connected.

Figure 2:
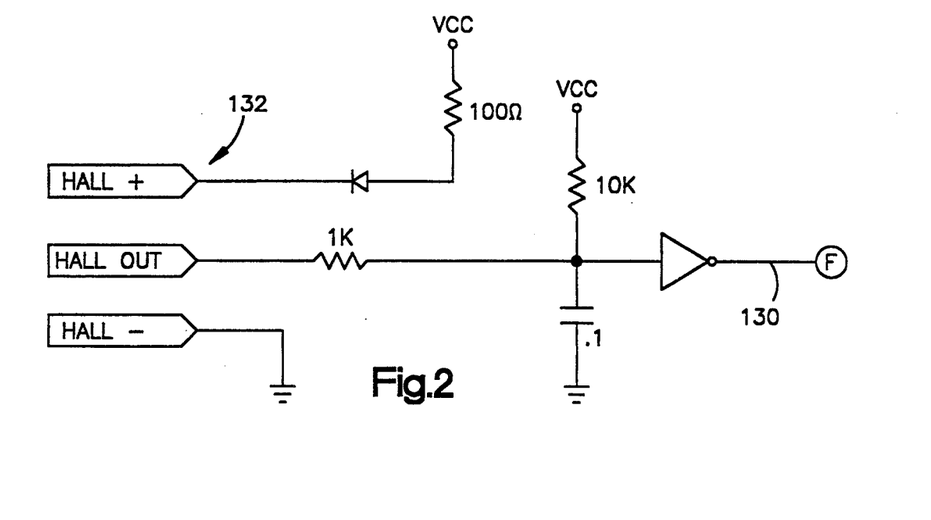
FIG. 2 is a schematic of a position sensor circuit that utilizes a Hall Effect device to sense when a sunroof panel is in a park position.

A first step of the calibration sequence is to move the sunroof panel from a park or closed position to the full vent position. The controller 22 knows when the sunroof panel is in the closed position by monitoring an output 130 from a Hall Effect sensor 132. A Hall Effect output goes low when the sunroof panel is in the parked position. This guarantees that the roof is in a known position. The controller records the physical position once the motor stalls. The sunroof panel is then moved to the full open position and this physical position is recorded. These steps allow the controller 22 to adjust its operation for various lengths of travel. The controller 22 next again returns to the full vent position and again records this position. The calibration sequence ends by returning the sunroof to the park position. During the calibration sequence, the controller 22 develops a signature or profile for the motor current as the sunroof is being closed. Use of the signature or profile to detect obstructions is discussed below.

Obstruction Detection

To detect an obstruction when the sunroof panel is closing, the controller 22 measures the battery voltage, motor current, absolute position of the sunroof, and the speed at which the roof is traveling. In order to detect an obstruction the controller must first be trained to the roof which it will be operating. Once the controller is placed into the calibrate mode it will begin to record the motor current for every inch of sunroof travel. This information is placed into a table in controller memory which is referred to as a template. When the obstruction detection algorithm is active, motor current is measured every two milliseconds and compared against the template value.

The comparison has a window threshold which is plus or minus 37.5% of the template value. If the sensed current falls within the window, the value is interpreted to be normal and is then used to update the template value. The new template value is calculated to be twice the old value plus the current reading all divided by three. In equation form:

$$NewValue = [2(OldValue) + CurrentReading]/3$$

This is a weighted average where new reading contributes one third of the total new value. This method of checking to see if the current reading falls with a window is only used to check for a soft obstruction and is chosen due to the response time of the algorithm versus the speed of the sunroof.

Adapting the template values to existing conditions can avoid undesired shutdowns caused by changes in temperature, mechanical wear, or sunroof mounting. By updating the template, the controller changes its own obstruction sensing characteristics with time.

To detect a hard obstruction a different control algorithm is used that has a faster response time. This algorithm also reads the motor current every two milliseconds. The data is stored into a first in, first out (FIFO) buffer which is twenty values deep. This allows the controller 22 to look back in time 40 milliseconds in order to detect a rapid change in motor current. A maximum slope of sensed motor current is defined to detect an obstruction based on a percentage of the template value. In the equation below, the Template Value is the motor current reading at the then current position sensed during the calibration sequence and the FIFO Value is the sensed current at a time 40 milliseconds earlier.

$$CompareValue = 0.187(TemplateValue) + FIFOValue$$

If the current value of sensed current is greater than the compare value, an obstruction flag is set and the motor is de-energized. One problem that the controller addresses is the fact that the sunroof could be traveling at such a rate of speed that would not allow the controller to reverse the direction fast enough to meet the 22 pound force standard.

The roof speed is regulated based upon battery voltage. This is a primary function of the pulse width modulation output from the controller. By varying the duty cycle of the modulation applied to the gate of the FET 20 the speed of the motor is controlled as a function of sensed battery voltage. The greater the battery voltage the smaller duty cycle that is needed to achieve a particular speed.

Motor-Start-Up

If the sunroof is resting against an obstruction and then activated the normal obstruction techniques described previously will not work since the sensed motor current does not reach its template value instantaneously. When the controller 22 first energizes the motor 12 it supplies a 100% duty cycle pulse of power to the sunroof drive motor 12 for a short duration of 50 milliseconds. This time is chosen because it is short enough that the force on an object in contact with the sunroof will not reach 22 pounds in this interval. At the end of this short duration the motor current is sensed. If the motor current is greater than the normal start current measured during calibration then an obstruction has been detected. This procedure works even if the roof has a preloaded force on it.

After the first 50 milliseconds the controller pulse width modulates the motor from a low power level to a desired speed by ramping linearly up to the desired speed over a time interval of 450 milliseconds. By continuously varying the motor torque during start-up, the controller 22 detects an obstruction using the rate of speed of the motor.

Auto closure of the sunroof panel is achieved whenever an auto closure input 150 is grounded by the motorist and the ignition input 46 is removed. Ignition signal presence is sensed by an input 152 to the controller 22. If the auto closure input 150 is left ungrounded when the ignition is removed, the sunroof panel will remain in its present position. A fifteen second delay allows the user to close the sunroof after the ignition signal has been removed from the controller input 152. During this time the user can actuate the close input key to close the sunroof without having to return the key to the ignition. If the ignition key is switched again during the fifteen second timeout the controller returns to its normal operation. If the ignition signal is removed during an operation the controller will continue and complete the operation before stopping.

The preferred controller is a 6801 microprocessor having a 2-kilobyte read only memory. operating system.

While the present invention has been described with a degree of particularity it is the intent that the invention include all alterations and modifications from the disclosed design falling within the spirit or scope of the appended claims.

We claim:

1. Apparatus for activating a motor for moving a window or panel along a travel path and de-activating the motor if an obstacle is encountered by the window or panel comprising:

a) motor sense means for sensing the motor current as the motor moves the window or panel along a travel path;
   b) switch means for energizing the motor with an energization signal; and
   c) control means coupled to the switch means for controllably energizing the motor comprising:
      i) means for monitoring motor current from the motor sense means;
      ii) timer means for timing a start-up interval after motor energization;
      iii) a memory for storing a plurality of motor currents sensed by the motor sense means during a calibration sequence;
      iv) means for comparing sensed motor current after the start-up interval with values of motor current stored in the memory; and
      v) output means coupled to said switch means for stopping the motor if the sensed motor current exceeds the motor current stored in the memory after a delay corresponding to the start-up interval.

2. Apparatus for activating a motor to move a window or panel along a travel path and for de-activating the motor if an obstacle is encountered by the window or panel comprising:

a) motor sense means for sensing the motor current as the motor moves the window or panel along a travel path;
   b) switch means for energizing the motor with an energization signal; and
   c) control means coupled to the switch means for controllably energizing the motor comprising:
      i) output means coupled to said switch means for controlling motor energization during a calibration sequence to define a motor current profile of the window or panel;
      ii) means for monitoring motor current from the motor sense means during the calibration sequence and storing the motor current profile as a function of a position of said window or panel along its travel path;
      iii) a buffer for storing a plurality of consecutive motor current readings as the motor moves the window or panel;
      iv) means for comparing sensed motor current and position with the motor current profile and for comparing the present sensed motor current with the rate of change limit; and
      v) output means coupled to said switch means for stopping motor energization if the sensed motor current deviates from the motor current profile more than a threshold amount or the present motor current exceeds the rate of change limit.

3. The apparatus of claim 2 additionally comprising a sensor for generating a sequence of pulses as the motor moves the window or panel along the travel path and wherein the control means includes means for monitoring receipt of said sequence of pulses to determine the position of the window or panel.

4. The apparatus of claim 3 wherein the control means additionally comprises means to inhibit de-activation of the motor as the motor moves the window or panel into contact with a gasket.

5. A method for activating a motor to move a motor vehicle window or panel along a travel path and for de-activating the motor if an obstacle is encountered by the window or panel comprising the steps of:

a) controlling motor energization during a calibration sequence to define a motor current profile of the window or panel;
   b) monitoring motor current during the calibration sequence and storing the motor current profile as a function of a position of said window or panel along its travel path;

c) subsequent to the calibration sequence as the motor moves the window or panel, periodically sensing motor current and comparing sensed motor current with the motor current profile as the motor moves the window or panel; and d) stopping motor energization if the sensed motor current deviates from the motor current profile by more than a threshold amount.

6. The method of claim 5 comprising the additional step of monitoring a series of sequential motor current values, storing the series of motor current values in a memory, comparing a just sensed current value with a threshold current value that is a function of a value of motor current from the calibration step and a recently stored motor current value and de-activating the motor if the just sensed current value deviates too far from the threshold current value.

7. The method of claim 5 wherein the comparing step compares a motor start-up current after a predetermined start-up interval with a start-up current measured during the calibration sequence.

8. The method of claim 5 wherein the step of monitoring motor current comprises a substep of generating a series of pulses as a motor shaft rotates and determining a position of the window or panel from a park position by counting pulses as the window or panel moves from the panel position.

9. The method of claim 5 additionally comprising the step of periodically sensing a battery voltage used to energize said motor and pulse width modulating a motor energization signal to limit the speed of the window or panel.

10. Apparatus for activating a motor that moves a motor vehicle window or panel along a travel path comprising:

a) current sense means for sensing motor current as the motor moves the window or panel along a travel path;

b) switch means for energizing the motor with an energization signal;

c) encoder means for monitoring motor operation during movement of the window or panel and for generating an encoder output; and d) control means for controllably energizing the motor during a calibration sequence and during normal operation of the motor vehicle window or panel comprising:

i) means for monitoring motor current from the motor sense means;

ii) means for monitoring the encoder output and updating a position of the window or panel based upon receipt of said encoder output;

iii) a memory for storing a plurality of motor currents sensed by the current sense means to form a motor current template;

iv) means for comparing sensed motor current pulses with a motor current template that changes with the position of the window or panel; and v) output means coupled to said switch means for activating the switch means.

11. The apparatus of claim 10 wherein the encoder means comprises means for generating first and second pulse sequences and wherein the means for monitoring senses the speed, position and direction of movement of the window or panel.

12. The apparatus of claim 10 wherein the control means further comprises means for sensing a voltage level of a power source that energizes the motor and comprises means for pulse width modulating an output from the output means at a duty cycle to control the speed of movement of the window or panel.

* * * * *